March 5, 1957 E. J. GARGINI 2,784,343

TELEVISION RELAY APPARATUS

Filed Dec. 27, 1952 2 Sheets-Sheet 1

Inventor
ERIC JOHN GARGINI
By Ralph E. Atherton
Attorney

March 5, 1957 E. J. GARGINI 2,784,343

TELEVISION RELAY APPARATUS

Filed Dec. 27, 1952 2 Sheets-Sheet 2

Inventor
ERIC JOHN GARGINI
By Ralph E. Atherton
Attorney

United States Patent Office 2,784,343

Patented Mar. 5, 1957

2,784,343

TELEVISION RELAY APPARATUS

Eric John Gargini, Yiewsley, West Drayton, England, assignor to Electric & Musical Industries Limited, Hayes, Middlesex, England, a company of Great Britain Application December 27, 1952, Serial No. 328,183

Claims priority, application Great Britain January 1, 1952

8 Claims. (Cl. 315—26)

Figures 1, 2, 3, 4, 5:
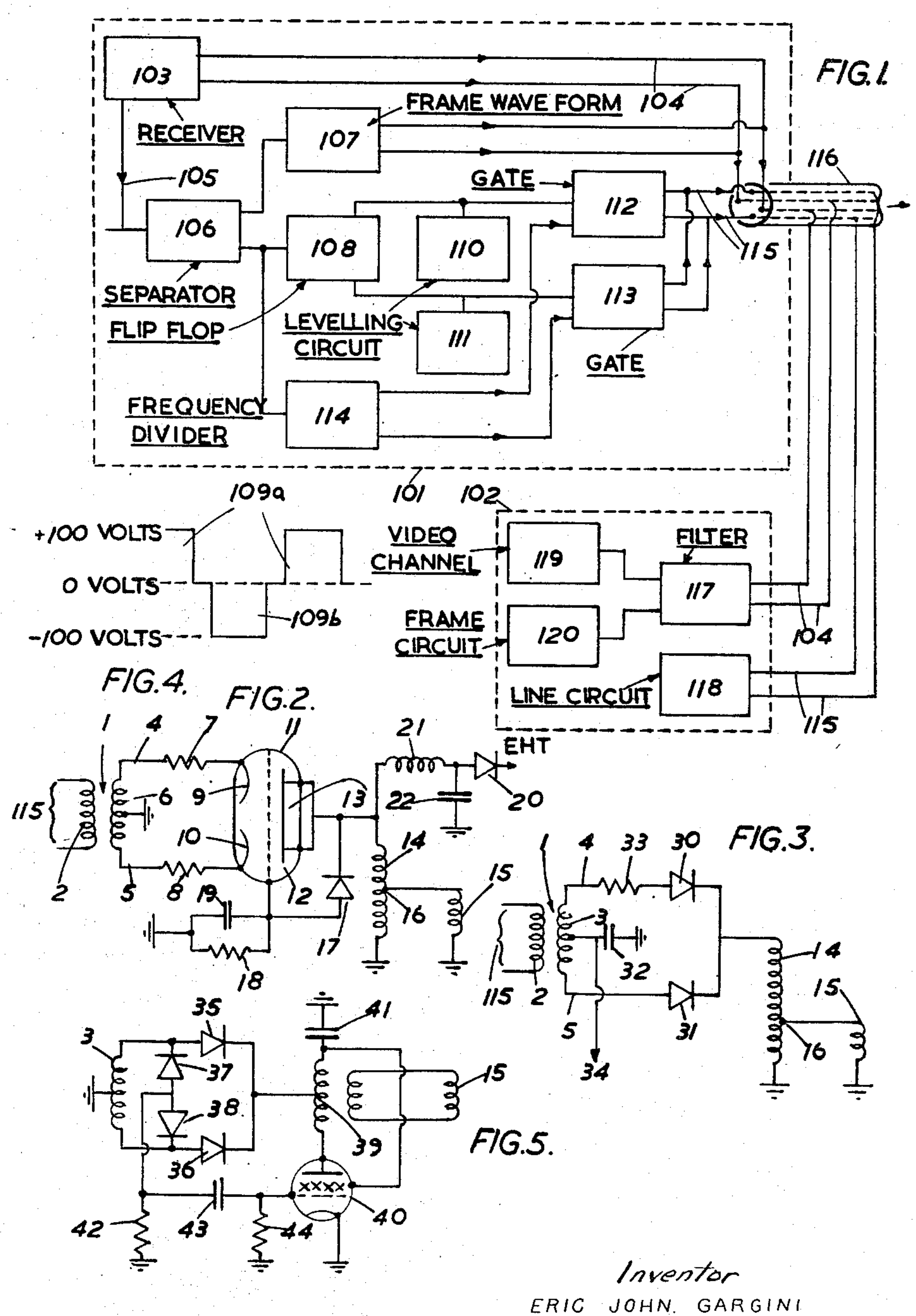

This invention relates to television apparatus and in particular to apparatus comprising a picture reconstituting device and means for feeding operating voltages to said device by cable from a remote point, such apparatus being referred to generally as television relay apparatus.

Television relay apparatus has been proposed in which video signals derived from a broadcast television waveform are fed by cable from a distributing unit to a plurality of terminal receiver units together with synchronised scanning information generated at the distributing unit. Each receiver comprises a picture reconstituting device and on economic considerations it may sometimes be desirable that all the electrical energy for operating a group of receivers should be supplied over the relay cable so that separate mains energisation of each receiver is unnecessary.

In order to operate receivers without individual mains energisation the signals received at a receiver should be capable of yielding video and sound information, heater current, the high voltage (usually referred to as E. H. T.) necesary for the final anode of the image reproducing cathode ray tube, and such other polarising voltages as may be required. However the transmission of such signals via a limited number of cable conductors presents a serious difficulty, especially since there are generally stringent limitations on the amplitude of potentials that may be sent on a relaying cable, the maximum amplitude being for example 100 volts with respect to ground with a root means square voltage amplitude not exceeding 60 volts.

The object of the present invention is to reduce the aforesaid difficulty.

In the operation of the receiver without separate mains energisation a considerable proportion of the power necessary for operation of the receiver is consumed by the line scanning circuit, bearing in mind that the E. H. T. is usually derived from the line scanning circuit. A suitable voltage waveform for transmission to a receiver to produce line scanning currents thereat is of an asymmetrical character comprising a substantially uniform voltage during the intervals corresponding to the line forward strokes interrupted by narrow pulses of large amplitude and opposite polarity during intervals corresponding to line return strokes. However, on account of the aforesaid amplitude restrictions the transmission of adequate power by such a waveform is difficult since a large proportion of the voltage range is occupied by the narrow, large amplitude pulses.

A further object of the present invention is to provide television relay apparatus comprising a distributing unit and at least one television receiver coupled to the distributing unit by a cable so that operating signals for the receivers can be relayed by the cable from the distributing unit and wherein said cable includes two conductors and means are provided at the distributing unit for applying a voltage waveform between the conductors which is of such a character that sufficient power can be relayed to the receiver for maintaining an adequate E. H. T. supply.

In apparatus according to the present invention the voltage waveform applied to the conductors at the distributing unit comprises portions which have an extreme value for a major part of each line period and interruptions between said portions, and the line scanning circuit provided at the receiver is responsive to said voltage waveform for generating a line scanning waveform having return strokes timed by said interruptions, and means are coupled to said scanning circuit for deriving an E. H. T. supply for said cathode ray tube in response to said return strokes.

As will hereinafter appear the voltage waveform may have a symmetrical character, the portions of extreme value being alternately of opposite polarity. Alternatively the voltage waveform may have a character of an interrupted D. C. voltage.

Each of the aforesaid alternative forms of the invention have certain relative advantages and may be used in suitable circumstances although it may be pointed out that there are statutory limitations on the transmission of D. C. by cable in some countries.

Figure 6:
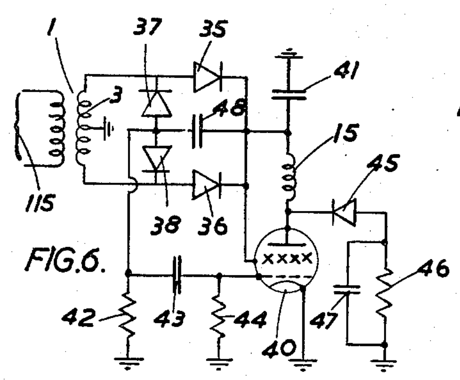
Figure 8:
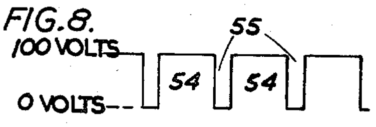
Figures 7, 9, 10:
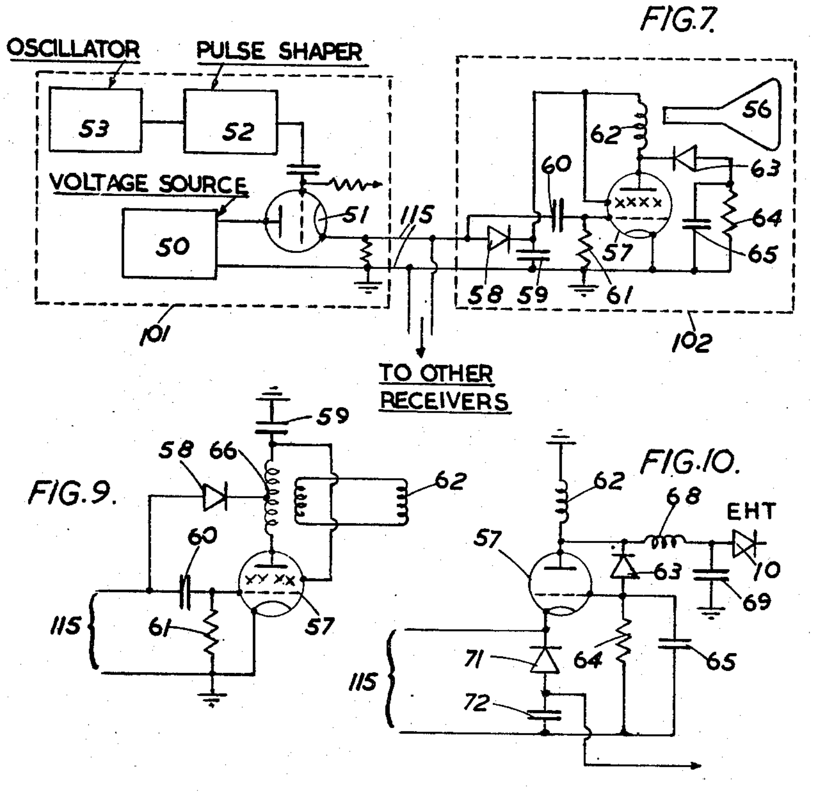

In order that the invention may be clearly understood and readily carried into effect, the invention will be described with reference to the accompanying drawings, in which:

Figure 1 illustrates diagrammatically and in block form the general layout of one example of apparatus according to the present invention, Figure 2 illustrates one form of line scanning circuit suitable for use in a receiver of apparatus according to Figure 1, Figure 3 illustrates another form of such scanning circuit, Figure 4 illustrates a waveform explanatory of the operation of the present invention, Figures 5 and 6 illustrate other forms of such scanning circuits, Figure 7 illustrates a modification of apparatus according to Figure 1, Figure 8 is a waveform diagram explanatory of the operation of Figure 7, and Figures 9 and 10 illustrate modifications of part of Figure 7.

Referring to the drawings, the dotted rectangle denoted by reference 101 in Figure 1 represents a distributing unit of television relay apparatus and the dotted rectangle denoted by reference 102 represents a receiver in such apparatus. The distributing unit comprises a receiver channel which is merely denoted by the block 103 and is of such a construction as to deliver a first output of carrier wave energy modulated with video signals via conductors 104 and a second output of synchronising signals via a conductor 105. The receiver channel 103 may either pick up broadcast television waveforms directly by means of an aerial or may constitute a repeating amplifier which receives signals of the waveform described, for example in the specification of United States patent application Serial No. 232,577. The synchronising signals delivered by the conductor 105 may be of the standard form used in broadcast transmissions or of some other form peculiar to the relay apparatus but in either case the synchronising signals comprise line and frame frequency components. These components are separated in a separator 106 and the frame frequency components are fed to a circuit 107 which is arranged to deliver an output of frame frequency sawtooth waveforms. These waveforms are added to the conductors 104 bearing the carrier wave modulated with the video signals, the frequency of the carrier wave being for example 5.42 megacycles per second so that interference between the sawtooth waveforms and the modulated carrier wave does not arise. The line frequency components from the separator 106 are applied to a single stroke multivibrator, or so-called flip flop, which is arranged to set up an output of pulses of line frequency each of a duration of approximately 85 percent of a line period. It is further arranged that paraphase versions of these waveforms are derived from different points in the multivibrator so that the pulse 109*a* in Figure 4 represents a pulse derived from one of said points and reference 109*b* represents a pulse derived from the other of said points. The outputs from the two points are then applied to levelling circuits 110 and 111 which are so arranged that the pulses from the two points though of opposite polarity have the same datum level. The levelled pulse outputs are then applied to gates 112 and 113 which are gated alternately at half line frequency by means of the output of a frequency divider 114 which receives an input of the line frequency components from the separator 106. The multivibrator 108, levelling circuits 110, 111, and the gates 112, 113 and the divider 114 may each be of a variety of known forms and are shown merely in block form. The outputs of the two gates 112 and 113 are combined and fed to a pair of conductors 115 and these conductors together with the conductors 104 are included in a single cable denoted by the reference 116. Any other suitable circuit for generating the desired voltage waveforms may of course be used.

The receiver 102 which is illustrated in the drawing, comprises a filter circuit 117 which is tapped on the conductors 104 and a line scanning circuit 118 which is tapped on the conductors 115. The line scanning circuit will be further described subsequently, and as will hereinafter appear it not only supplies line scanning currents to the appropriate coils but also produces E. H. T. for operation of the picture reconstituting cathode ray tube. The filter 117 separates the frame sawtooth waveforms from the modulated carrier wave delivered by the conductors 104. The modulated carrier wave is fed from the filter to a video channel which will be assumed to include a demodulator and the aforesaid picture reconstituting tube, the video channel being represented by the block 119. The video signal carrier wave may alternatively be fed directly on to the modulator electrode of the picture reconstituting tube, taking advantage of the fact that said tube can funcion as a rectifier. The frame sawtooth waveform is in turn fed to a frame scanning circuit 120 and it can be arranged that such heater current as required by the receiver is derived from this circuit.

Figure 2 illustrates a construction which may be adopted for the aforesaid line scanning circuit 118, reference 1 denoting a transformer whose primary winding 2 is connected between the conductors 115. There is thus applied across the winding 1 the voltage of symmetrical waveform shown in Figure 4 of half line repetition frequency. When said voltage is fed over said conductors 115 the difference of potential between the conductors of the cable suffers equal positive and negative excursions of the order of 100 volts. Similar excursions of potential are set up simultaneously at the ends 4 and 5 of the secondary winding 3 of the transformer 1 with respect to the grounded center tap 6 of the winding 3. The ends 4 and 5 of the winding 3 are connected respectively via the balancing resistors 7 and 8 to the separate cathodes 9 and 10 of the electron discharge tube 11. This tube may be a uni-directional gas valve of the hydrogen type and is provided with a control grid 12, and an anode 13 serving to collect electrons emitted from said cathodes. The anode 13 is grounded through the tapped winding 14 and line scanning coils 15 are connected from the tapping point 16 of the winding to ground. Impulses set up at the anode 13 are applied to the rectifier 17 which is connected to a grid-biassing or polarising circuit comprising the parallel combination of resistor 18 and condenser 19 connected as shown from the grid 12 to ground. The anode 13 is connected to a further rectifier 20 via the inductance 21 for the purpose of setting up E. H. T. for the cathode ray tube of the receiver, a condenser 22 being connected from the junction of 20 and 21 to ground. The inductance 21 and condenser 22 are so chosen that impulses appearing at the anode 13 are applied to the rectifier 20 with magnified amplitude so as to set up the required E. H. T.

In operation, the amplitude of positive and negative excursions of potential applied to the cathodes 9 and 10 may be 110 volts with respect to ground and the control grid 12 may be biassed to the extent of 100 volts negative to ground. During positive excursions of either of said cathodes 9 and 10 no electrons are emitted from the respective cathode so as to be collected by the anode 13. On the other hand said cathodes alternately emit to said anode during negative excursions of potential applied to them and during such negative excursions the anode may be brought to a potential of 100 volts negative to ground. This potential communicated via the rectifier 17 sets up a smoothed bias potential, already referred to, applied to the control grid 12. During the periods in which the potential at the anode 13 is 100 volts negative with respect to ground, the forward stroke of a saw-tooth scanning current is generated in the line scan coils 15 and the generation of this current is interrupted with the termination of each negative excursion at the cathodes, that is with the termination of each pulse in the waveform of Figure 4. The tube 11 thereupon becomes cut off by virtue of the steady bias on the control grid 12 and the current in the scanning coils performs a free half cycle of oscillation to generate a return stroke of said sawtooth current. During the return stroke the current becomes reversed and the potential of the anode 13 may execute a positive excursion of more than 1,000 volts. This excursion may be considerably in excess of 1,000 volts without the tube 11 being caused to conduct provided that tube 11 possesses a sufficiently large magnification factor. The amplitude of excursion may be adjusted by means of a suitable condenser connected across the line scan coils. By arranging that the inductance 21 and the capacitor 22 are of appropriate value, the positive excursions appearing at the anode 13 may be applied to the E. H. T. rectifier 20 in such magnified form that E. H. T. of the order of 5 kv. is available. By suitable proportioning the intervals between pulses in the waveform of Figure 4 the tube 11 is maintained in a cut off condition for substantially the whole of each flyback period so that the positive excursions of the anode 13 are executed without appreciable damping by the tube 11.

The rectifier 17 is selected so as to be suitable for carrying currents of the order of those flowing in the tapped inductance coil 14, and the resistance 18 and capacity 19 may be chosen so that in conjunction with the rectifier 17 a balancing circuit is effectively connected across the scanning coils that functions in the well-known manner of damper and efficiency circuits. The balancing resistances 7 and 8 in the input circuit of the tube 11 are adjusted so that successive line scans are generated of equal amplitude.

If desired the resistor 18 and condenser 19 may be chosen so that a steady bias is not applied to the control grid 12 but so that there is superposed on the bias a small fluctuation of line repetition frequency with the object of shaping the line scanning waveform and rendering said waveform more nearly linear.

Figure 3 is generally similar to Figure 2 and corresponding parts bear the same reference numerals. The inductance coil 14 is however connected to the cathodes of rectifiers 30 and 31 which may be diode valves or metal rectifiers and whose anodes are respectively connected to the ends 4 and 5 of the secondary winding 3 of the transformer 1, the center tap of which winding is not, as in Figure 1, connected directly to ground but through the condenser 32. Moreover, only one balancing resistor 33 is employed and the side of the condenser 32 not connected to ground is connected via the conductor 34 to a load, not shown, which may be constituted by the H. T. circuits of the valves of associated equipment.

In operation a sequence of impulses is set up across the tapped inductance coil 14 with the recurrence frequency of transitions between positive and negative half cycles of the voltage fed by the cable to the primary winding of the transformer 1 and if said load is correctly proportioned, said impulses are established across the inductance coil 14 with substantially zero D. C. component so that substantially linear sawtooth currents are generated in the line scanning coils 15. If desired E. H. T. for the cathode ray tube may be derived from the inductance coil 14 in a manner similar to that described with reference to Figure 2. Adjustment of the balancing resistance 33 is made to ensure that successive scans are rendered substantially equal in amplitude.

Figure 5 illustrates another construction which may be adapted for the line scanning circuit 118 and in this figure two pairs of rectifiers 35 and 36, and 37, 38 are connected as shown across the secondary winding 3 of the transformer 1. The rectifiers 35 and 36 are of relatively high current capacity and are connected to a tap on the primary winding of a transformer 39 which is connected in the anode lead of an evacuated valve 40 which is shown as a tetrode, the upper end of the primary winding being connected to ground via condenser 41 of relatively large capacity. The line scanning coils 15 are included as shown in the secondary circuit of the transformer 39. The junction of the rectifiers 37 and 38 is grounded via a resistance 42 and connected to the control electrode of the valve 40 via condenser 43 which is provided with a leak resistance 44.

In operation of this arrangement, the rectifiers 35 and 36 conduct alternately to produce, as before, full wave rectification of the voltage waveform shown in Figure 4 and maintain the condenser 41 charged to a relatively high positive potential which provides a smoothed polarising potential for the valve 40. It may also provide polarising potential for other valves in the receiver. Moreover, the rectifiers 37 and 38 pass current which produces a negative sawtooth waveform voltage across the condenser 43 so that the valve 40 is switched off by the leading edge of each of the pulses 109*a* and 109*b* and is switched on again when the condenser 43 has charged via resistance 44. When the valve 40 is conducting the anode current generates at least a portion of the long flank of the sawtooth waveform oscillation of line frequency, in known manner, this oscillation being applied via the transformer 39 to the coils 15. When the valve 40 is abruptly switched off a return stroke is generated by free oscillation in the scanning coils 15, the rectifiers 35 and 36 being maintained non-conducting by the high positive potential excursion which appears at the anode of the valve 40. At the end of the return strokes, the potential at the anode of the valve 40 tends to swing in the negative direction and the rectifiers 35 and 36 conduct to damp this oscillation, the current taken by the rectifiers 35 and 36 at this time being employed to provide the first part of the next forward stroke and during this period the valve 40 can with advantage be maintained non-conducting. Accordingly the time constant of the condenser 43 and resistance 44 is adjusted so that the condenser 43 can charge following each leading edge of a pulse 109*a* or 109*b* sufficiently rapidly so that the valve 40 is again rendered conducting before the damping current in the diodes 35 and 36 becomes insufficient to maintain the linear current waveform in the coils 15.

Figure 6 illustrates a modification of Figure 5 in which a separate rectifier 45 is provided for damping the free oscillation which produces the return strokes, this rectifier being connected in series with the parallel combination of a resistance 46 and a condenser 47, the lower end of which is grounded. The resistance 46, for example, may be the heater chain of the receiver, in which case the frame scanning circuit 120 need not provide an output of heater current. In this arrangement the scanning coils 15 are moreover directly connected in the anode lead of the valve 40, the storage condenser 41 being connected as shown between the upper end of the coils and ground. E. H. T. can of course be derived from the line scanning circuits of Figures 5 and 6 in a manner similar to that described with reference to Figure 2. Moreover in both Figures 5 and 6 it is possible by suitably proportioning the condenser 43 and the resistances 42 and 44 to control the waveform of the current variation in the coil 16 and if desired the potential applied to the control electrode of the valve 40 can be arranged to hold this valve non-conducting during the periods when the rectifier 45 is conducting. The condenser 48 connects the junction of the rectifiers 35 and 36 to the junction of the rectifiers 37 and 38.

In the forms of the invention so far described, operating energy is relayed to the receivers by maintaining a voltage of extreme value between the conductors 115 for a major part of each line period and diminishing the voltage for the remaining part of each line period, the extreme voltage having opposite polarities in alternate line periods, so that the voltage has a pulse waveform of a symmetrical character. The modified form of relay apparatus illustrated in Figure 7 is designed for the transmission of a voltage waveform for energizing the line scanning circuit 118 and which again has an extreme value for a major part of each line period but which is in the form of an interrupted D. C. voltage, so that it comprises pulses which are all of like polarity. Only the part of the distributing unit 101 required for generating these voltage pulses is shown and this part comprises a low impedance source 50 of stabilised voltage of a uniform level of, say, 100 volts with respect to ground, one terminal of the source 50 being grounded as shown. The voltage is applied between the conductors 115 via a series control valve 51 which may be either a gas discharge valve or an evacuated valve. The valve 51 has a control electrode to which are applied periodic negative pulses which are of sufficient amplitude to switch off the valve 51 and which are derived from a shaping circuit 52 which receives its input from a master oscillator 53. The arrangement is such that the negative pulses occur at line scanning frequency of the television system for which the apparatus is intended, the leading edges of negative pulses being synchronised with the leading edges of the line synchronising pulses of the broadcast television waveform picked up by the distributing unit. A fragment of the voltage waveform set up between the conductors 115 is illustrated in Figure 8 and it comprises pulses 54 during which the voltage amplitude is uniform separated by interruptions 55, the voltage between the conductors 115 being reduced to zero or nearly so during each interruption.

The parts of the receiver 102 shown in Figure 7 comprise mainly the line deflecting circuit for the picture reconstituting tube 56. The line deflecting circuit comprises an amplifying valve 57 and the voltage waveform from the conductors 115 is applied in parallel to the series combination of rectifier 58 and storage condenser 59 and to the control electrode of the valve 57 via blocking condenser 60 and leak resistance 61. The rectifier 58 may be a metal rectifier or a diode valve as described. The junction of the rectifier 58 and the condenser 59 is connected to the anode of the valve 57 via an inductance 62 which may constitute the line scanning coils of the tube 56 or may be coupled to the line scanning coils by means of a transformer in known manner. The anode of the valve 57 is also connected to the cathode of a damping rectifier 63 and the anode of the rectifier 63 is connected to ground via the parallel combination of a resistance 64 and condenser 65. It will be observed that the line scanning circuit of Figure 7 is substantially similar to Figure 6, except for the transformer 1 and the full wave rectification facilities of Figure 6. The operation of Figure 7 is likewise similar to Figure 6. Thus the rectifier 58 conducts during the pulses 54 of the voltage waveform set up between the conductors 115 and charges the condenser 59 so that it acts as the source of circuit polarising voltage for the valve 57, and others if desired. Moreover the pulses 54 applied to the control electrode of the valve 57 control the switching off and on of this valve. Likewise the rectifier 63 conducts to damp the free oscillation which produces each return stroke of the sawtooth waveform current in the coils 62 the current taken by the rectifier 63 providing the first part of each forward stroke of said sawtooth waveform. When the rectifier 63 is conducting the valve 57 can, with advantage, be maintained non-conducting, by causing the interruptions 55 to have a duration exceeding the return strokes. The voltage set up across the condenser 65 can be employed as a negative voltage supply, for instance for the heater chain of the receiver which may constitute the resistance 64. The E. H. T. voltage for the tube 56 can be derived from the line deflecting circuit flyback pulses in known manner.

In the modification shown in Figure 9, the rectifier 58 is connected to a tapping on a transformer primary winding 66. Condenser 59 is now connected between ground and the upper end (in the drawing) of the winding 66, and the scanning coils 62 are connected across the secondary winding 67 of the transformer. Figure 9 thus resembles Figure 5 and its operation is essentially similar the rectifier 58 functioning as a damping device as well as a charging path for the condenser 59. Components 63, 64 and 65 of Figure 7 are thus dispensed with.

The modification illustrated in Figure 10 can be employed if the voltage waveform of Figure 8 is negative with respect to ground. In this case the "live" conductor 115 is connected to the cathode of the valve 57 and the scanning coils 62 are connected in the anode lead of this valve, their upper end being directly grounded. Moreover, the junction of the rectifier 63 and condenser 65 is connected to the control electrode of the valve 57 whereby the control electrode is biassed negatively with respect to ground and maintains the valve 57 non-conducting during the interruptions 55. In Figure 10 the anode of the valve 57 is shown connected to an E. H. T. generation circuit comprising inductance 68, condenser 69 and rectifier 70. In operation of the arrangement shown in Figure 10, the current drawn by the valve 57 is of a sawtooth waveform and it is desirable, in order to make most efficient use of the available energy that the current waveform should be similar to the voltage waveform of Figure 8. Therefore the series combination of a rectifier 71 and a storage condenser 72 is connected as shown between the conductors 115 and the rectifier 71 tends to draw the current required to cause the waveform of the current taken by the receiver 102 to correspond to the waveform of Figure 8. The current drawn by the rectifier 71 is stored by the condenser 72 which can be used as H. T. supply for other parts of the receiver.

Where the limitations on the voltage which can be applied to the conductors 115 with respect to ground are such that it is difficult to supply sufficient energy to the receiver 102 by maintaining one of the conductors at ground potential, it is possible to increase the energy available by feeding the conductors 115 with equal positive and negative voltages except during the interruptions 55 when the voltage on one conductor is reduced to that on the other conductor.

What I claim is:

1. In television relay apparatus comprising a signal distributing unit, at least one television receiver including a cathode ray image reproducing tube, and a cable from said unit to said receiver for feeding operating signals from said unit to said receiver; two conductors in said cable, means at the distributing unit for applying a voltage waveform between said conductors comprising portions of one polarity having a fixed amplitude for the major part of alternate line periods, and portions of opposite polarity having the same amplitude for the major part of intervening line periods and line frequency interruptions to zero voltage between said portions, a line scanning circuit at the receiver responsive to said voltage waveform for generating a line frequency scanning waveform having return strokes timed by the interruptions, and means coupled to said scanning circuit for deriving an E. H. T. supply for said cathode ray tube in response to said return strokes.

2. Apparatus according to claim 1, said line scanning circuit comprising valve means having an input circuit, and an output circuit including a line scanning coil for said cathode ray tube, means for rectifying said voltage waveform, a storage device, means for applying the output of said rectifying means to said storage device and to said input circuit, said storage device being connected to provide a polarizing voltage for said valve means and said valve means being connected to conduct in response to said waveform portions of fixed amplitude and to be switched off in response to said interruptions.

3. In television relay apparatus comprising a signal distributing unit, at least one television receiver including a cathode ray image reproducing tube, and a cable from said unit to said receiver for feeding operating signals from said unit to said receiver; two conductors in said cable, means at the distributing unit for maintaining a voltage of extreme value between said conductors for a major part of each line period and diminishing said voltage for the remainder of each line period, a control valve having at least an output electrode, a control electrode and a cathode, an input circuit connected between said control electrode and cathode and an output circuit connected between said output electrode and cathode, said output circuit including an inductive line scanning coil for said cathode ray tube, a storage device connected to provide a unidirectional power supply for the output electrode of said control valve, means for feeding said voltage from said conductors to change said storage device, and means for feeding said voltage from said conductors to said input circuit, said valve being connected to conduct in response to said voltage of extreme value to produce forward strokes in said coil and to be switched off in response to amplitude changes in said voltage to produce return strokes in said coil.

4. In television relay apparatus comprising a signal distributing unit, at least one television receiver including a cathode ray image reproducing tube and a cable from said unit to said receiver for feeding operating signals from said unit to said receiver; two conductors in said cable, means at the distributing unit for maintaining a voltage of extreme value between said conductors for a major part of each line period and diminishing said voltage for the remainder of each line period, a line scanning coil for said cathode ray tube at said receiver, valve means having a load circuit including said coil, storage means for deriving smoothed unidirectional voltage from said first voltage, circuit connections from said storage means to said valve means to polarise said valve means, said storage means constituting the sole polarising means for said valve means, means for controlling said valve means in response to said first voltage to produce a current variation of sawtooth waveform in said coil and including means to switch off said valve means in response to amplitude changes in said first voltage to produce return strokes in said waveform.

5. Apparatus according to claim 4, said means for maintaining a voltage between said conductors comprising a source of unidirectional voltage, and said switch means for intermittently applying said voltage between said conductors.

6. In television relay apparatus comprising a signal distributing unit, at least one television receiver including a cathode ray image reproducing tube and a cable from said unit to said receiver for feeding operating signals from said unit to said receiver; two conductors in said cable, means at the distributing unit for maintaining a voltage of extreme value between said conductors for a major part of each line period and diminishing said voltage to zero for the remainder of each line period, the voltage of extreme value having opposite polarities during alternate line periods, a line scanning coil for said cathode ray tube at said receiver, valve means having a load circuit including said coil, rectifying means, storage means, means for applying said voltage from said conductors to said storage means via said rectifying means to derive a smoothed unidirectional voltage, circuit connections from said storage means to said valve means to polarise said valve means, said storage means constituting the sole polarising means for said valve means, means for controlling said valve means in response to said first voltage to produce a current variation of sawtooth waveform in said coil and including means to switch off said valve means in response to amplitude changes in said first valve, to produce return strokes in said waveform.

7. Apparatus according to claim 4, said means for feeding the voltage from said conductors to said storage device comprising rectifying means, and a damping circuit for said coil including said rectifying means.

8. Apparatus according to claim 4 comprising a valve heater circuit in said receiver energised from said storage means.

References Cited in the file of this patent

UNITED STATES PATENTS

| | | |
|---|---|---|
| 2,458,532 | Schlesinger | Jan. 11, 1949 |
| 2,536,838 | Clark | Jan. 2, 1951 |
| 2,645,717 | Massman | July 14, 1953 |
| 2,701,851 | Palmer | Feb. 8, 1955 |

FOREIGN PATENTS

| | | |
|---|---|---|
| 446,354 | Great Britain | Apr. 29, 1936 |
| 828,051 | France | May 10, 1938 |
| 513,665 | Great Britain | Oct. 18, 1939 |
| 854,889 | France | Apr. 26, 1940 |